(12) United States Patent
Hillyard

(10) Patent No.: US 10,146,520 B1
(45) Date of Patent: Dec. 4, 2018

(54) UPDATING A RUNNING APPLICATION ON A COMPUTING DEVICE

(75) Inventor: Paul Byron Hillyard, Lindon, UT (US)

(73) Assignee: Ivanti, Inc., South Jordan, UT (US)

( * ) Notice: Subject to any disclaimer, the term of this patent is extended or adjusted under 35 U.S.C. 154(b) by 248 days.

(21) Appl. No.: 12/967,985

(22) Filed: Dec. 14, 2010

(51) Int. Cl.
   *G06F 9/44* (2018.01)
   *G06F 8/65* (2018.01)

(52) U.S. Cl.
   CPC ...................... *G06F 8/65* (2013.01)

(58) Field of Classification Search
   CPC .......................................................... G06F 8/68
   See application file for complete search history.

(56) References Cited

U.S. PATENT DOCUMENTS

| | | | | |
|---|---|---|---|---|
| 5,212,789 A * | 5/1993 | Rago | ................ | G06F 17/30377 |
| 5,278,979 A * | 1/1994 | Foster | ...................... | G06F 8/71 |
| 5,577,244 A * | 11/1996 | Killebrew | ................. | G06F 8/65 707/999.202 |
| 5,764,992 A * | 6/1998 | Kullick | .................. | G06F 8/656 717/170 |
| 6,681,389 B1 * | 1/2004 | Engel | ..................... | G06F 8/656 717/173 |
| 6,684,396 B1 * | 1/2004 | Brittain et al. | ............... | 717/168 |
| 2002/0144250 A1 * | 10/2002 | Yen | ........................... | G06F 8/65 717/168 |
| 2002/0194527 A1 * | 12/2002 | Murai et al. | ...................... | 714/6 |
| 2007/0006219 A1 * | 1/2007 | Sinha et al. | .................. | 717/174 |
| 2007/0061800 A1 * | 3/2007 | Cheng | ....................... | G06F 8/65 717/170 |
| 2007/0198652 A1 * | 8/2007 | Dickens | ............... | G06F 9/4416 709/217 |
| 2008/0282255 A1 * | 11/2008 | Kawamoto | ......... | G06F 11/1438 719/312 |
| 2008/0301663 A1 * | 12/2008 | Bahat | ..................... | G06F 8/656 717/170 |
| 2010/0064284 A1 * | 3/2010 | Winter | ..................... | G06F 8/70 717/169 |

\* cited by examiner

*Primary Examiner* — Li B. Zhen
*Assistant Examiner* — Lenin Paulino

(57) ABSTRACT

A computing device configured for updating a running application is described. The computing device includes a processor and instructions stored in memory. The computing device executes an old application. The computing device also renames an old application file that is currently in use. Furthermore, the computing device stores a new application file in the same folder as the old application file. The computing device additionally determines whether a new application is set up successfully. The computing device further executes the new application if the new application is set up successfully.

16 Claims, 8 Drawing Sheets

UPDATING A RUNNING APPLICATION ON A COMPUTING DEVICE

TECHNICAL FIELD

The present disclosure relates generally to computers and computer-related technology. More specifically, the present disclosure relates to updating a running application on a computing device.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. On a network, one or more servers may provide data, services and/or may be responsible for managing other computers. The managed computers are often referred to as nodes. A computer network may have hundreds or even thousands of managed nodes.

Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computing device is in a home or at a business, at least some maintenance and/or support is often needed. For example, computer software may be frequently upgraded or updated. New software is also continually being integrated into systems across the world. As illustrated by this discussion, systems and methods that improve updating an application may be beneficial.

DETAILED DESCRIPTION

Figure 1:
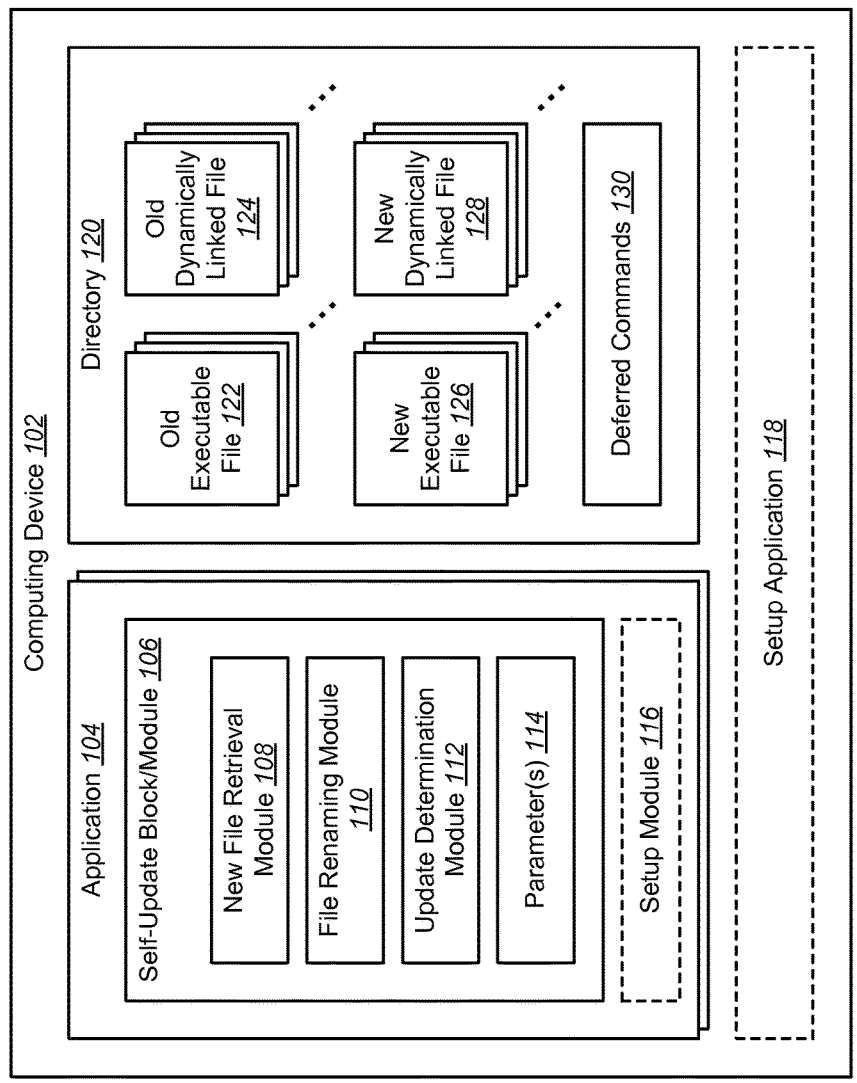
FIG. 1 is a block diagram illustrating one configuration of a computing device in which systems and methods for updating a running application may be implemented.

A computing device configured for updating a running application is disclosed. The computing device includes a processor and instructions stored in memory. The computing device executes an old application. The computing device also renames an old application file that is currently in use. The computing device additionally stores a new application file in the same folder as the old application file. Furthermore, the computing device determines whether a new application is set up successfully. The computing device also executes the new application if the new application is set up successfully.

The computing device may rename the old application file back to an original name if the new application is not set up successfully. The computing device may retrieve the new application file. The computing device may provide a parameter to the new application that is provided to or used by the old application. The computing device may terminate the old application.

The computing device may send a new application return code to an original caller when the new application is terminated. The computing device may store a deferred command. The computing device may receive an update command. The command may be received using a network.

A method for updating a running application on a computing device is also disclosed. The method includes executing, on a computing device, an old application. The method also includes renaming, on the computing device, an old application file that is currently in use. Furthermore, the method includes storing a new application file in the same folder as the old application file. The method additionally includes determining whether a new application is set up successfully. The method further includes executing, on the computing device, the new application if the new application is set up successfully.

A non-transitory, tangible computer-readable medium for updating a running application is also disclosed. The computer-readable medium includes executable instructions for executing an old application. The computer-readable medium also includes executable instructions for renaming an old application file that is currently in use. Additionally, the computer-readable medium includes executable instructions for storing a new application file in a same folder as the old application file. The computer-readable medium further includes executable instructions for determining whether a new application is set up successfully. The computer-readable medium also includes executable instructions for executing the new application if the new application is set up successfully.

The systems and methods disclosed herein may be used for updating a running application on a computing device. For example, an application may perform a self-update while running. Sometimes applications may be launched by a shell or third-party application that expects to wait for the application to complete before continuing on with further activities. If the target application contains self-update capability, traditionally, that means that it may perform the following actions. The application may download or otherwise obtain a newer copy of itself (or of its files). The application may launch a separate application to perform the setup task. The self-updating application may then quickly terminate so that the separate setup application can perform the necessary installation steps for the update or upgrade, replacing files that would otherwise be in use. However, terminating the application to perform the self-update may cause the launching application or shell application to incorrectly "move on" to further activities prematurely (before the target application has finished all that it was supposed to do).

The systems and methods disclosed herein describe maintaining a running application while performing a self-update and deferring application actions to the newly self-updated version of the application. In one configuration, the systems and methods disclosed herein may be applied to a Windows NT-based operating system.

In one configuration, the application may comprise an executable file (e.g., an .EXE file) that is currently running and one or more dynamic-link libraries (e.g., DLLs) that may or may not yet be loaded into the application's process space. Typically, loaded .EXE and .DLL files appear in use and cannot be deleted while running.

For example, the self-update-while-running application may perform the following steps. The application may check for a newer version of itself and/or any of its DLLs. If a newer copy is found, the application may download the files necessary for that newer copy. If any download step fails, the application may abort the self-update and continue with normal operation and/or fail (depending on the configuration). Once the new files are retrieved, the application may use the Windows Platform Software Development Kit (SDK) "MoveFile" or "MoveFileEx" function to rename all currently in-use files that are targeted for replacement by the new application installation. Although the files are in use, they may be renamed.

Continuing with the example, the application may copy the new application files (e.g., binaries) into the target folder. The application may then launch the setup for the new application or perform setup steps directly from the old application. Once the setup returns successfully, the new application may be launched (by the original or "old" application, for example), passing any parameters to the new application that were passed to the old application. If the setup fails, files may be renamed back to their original names so the old application will continue to run in the future. When the new application terminates, it may provide its return code to the original caller. For example, the computing device may wait for the new application to terminate, whereupon the return code is provided to the original caller. Deferred commands may be added to the "PendingFileRename" operations registry key to delete the renamed files.

This approach may work because the instance of the old application still runs properly, even though its files have been renamed. Even attempts to access resources or to seek in currently open files still work properly. For instance, calls to "LoadLibrary" and "GetModuleHandle" while passing the original filenames of currently loaded modules will properly return the cached handles of already-loaded DLLs instead of incorrectly loading instances of the new modules. One risk is that the original application may attempt to load a delay-loaded DLL after it is replaced during the setup program. However, this is unlikely and may be worked around by the implementer by making calls to any needed DLLs before performing the setup operation. Additionally, it is unlikely that the original application will perform many tasks beyond the launching of the new application, since it is "deferring" its actions to the new application.

According to the systems and methods disclosed herein, in-use files may be renamed. Furthermore, cached information based on an already-loaded file may be used, even if the file is no longer present (when calling "LoadLibrary" or "GetModuleHandle," for example). In some configurations, this behavior may be allowed according to default Windows behavior. The systems and methods disclosed herein may defer the need for a reboot until some later time, while still allowing immediate use of the newly installed application.

The systems and methods disclosed herein may also be used in a network context. For example, a network computing device (e.g., administrative system) may be configured to operate in conjunction with a maximum number of computers (e.g., managed nodes) at a time. If the network computing device were to contact too many computers simultaneously, the network could be overloaded with activities initiated on each of the target computers. In order to avoid this problem, the network computing device may implement a "wait for the application to terminate" approach. The network computing device may maintain a certain number of concurrent connections to target computers. It may not move to the next computer in its target list until one of the previous computers has completed or failed its assigned tasks. If the target application needs to terminate for any reason before completing its assigned tasks, then the network computing device may incorrectly move on to the next target computer. If this happens too many times, the network may be potentially over-burdened with traffic from too many computers performing network operations simultaneously. The systems and methods disclosed herein may help to alleviate this problem.

The systems and methods disclosed herein may be used instead of other alternative approaches. For example, one alternative approach would be to not perform the self-update automatically when assigned to perform other tasks. However, this may be inconvenient because a network computing device may not want to maintain an up-to-date status for computers. It would be more convenient if they updated themselves automatically.

Another alternative approach may be to first launch a separate update utility whenever the network computing device is about to launch an application that might need to self-update. This update utility could perform the update before returning, or else return that no update is needed. Then, the network computing device could launch the intended target application. However, this approach may fail if other instances of the target application are already running. Or, it may require a reboot to complete the installation (if renaming of in-use files is not attempted, for example). This approach also requires more effort when scheduling a task.

Various configurations are now described with reference to the Figures, where like reference numbers may indicate identical or functionally similar elements. The present systems and methods, as generally described and illustrated in the Figures herein, could be arranged and designed in a wide variety of different configurations. Thus, the following more detailed description of several configurations of the present systems and methods, as represented in the Figures, is not intended to limit the scope of the systems and methods, as claimed, but is merely representative of the configurations of the systems and methods.

FIG. 1 is a block diagram illustrating one configuration of a computing device 102 in which systems and methods for updating a running application may be implemented. Examples of the computing device 102 include desktop computers, laptop computers, supercomputers, servers, cellular phones, smartphones, tablet devices, e-readers, gaming devices, etc. The computing device 102 may include an application 104 and a directory 120. Optionally, the computing device 102 may include a setup application 118.

The application 104 may comprise software, a program, computer instructions, code, etc. that is executed or runs on the computing device 102. For example, instructions for the application 104 may be stored in memory and executed by a processor on the computing device 102 in order to execute or run the application 104. The application 104 may include a self-update block/module 106 and/or an optional setup module 116. The self-update block/module 106 may be implemented in software, hardware or a combination of both. For instance, the self-update block/module 106 may comprise instructions, code, software, etc. executed on a processor. It should be noted that the terms "new application" and "old application" are used herein to describe different application instances. As illustrated in FIG. 1, for example, the application 104 is illustrated as multiple applications 104. It should be noted that a "new application" may be an instance of the same and/or of different code or instructions that are used to generate an "old application" or an old application instance. For example, an old application instance may be different than a new application in a process space and/or in memory. Generally, an "old application" instance is produced or generated before a "new application" instance.

The self-update block/module 106 may be used to update the application 104. An "update" may modify the application 104. For example, an "update" may include new versions, patches, updates, upgrades, bug fixes and/or definitions, etc. for the application 104. An "update" may additionally or alternatively include a rollback or removal of one or more versions of the application 104, patches, updates, upgrades, bug fixes and/or definitions, etc. In one configuration, for instance, an update may include new vulnerability (e.g., virus, malware, adware, spyware, Trojans, worms, etc.) definitions and/or code used to address (e.g., remove, fix) the vulnerabilities.

The self-update block/module 106 may include a new file retrieval module 108, a file renaming module 110, an update determination module 112 and/or one or more parameters 114. The update determination module 112 may be used to determine whether any updates are available for the application 104 and/or whether any updates should be applied to the application 104. In one configuration, the update determination module 112 checks whether the application 104 is up to date with the latest available version, patches, updates, upgrades, bug fixes and/or definitions, etc. For example, the update determination module 112 may communicate with a remote computing device (over a network, the Internet, etc.) to make this determination. More specifically, for instance, the update determination module 112 may request a latest version number from a network device (e.g., website, server, computer, etc.) and compare that number with the version number of the current application 104. If there is a newer version number of the application 104 available, the update determination module 112 may determine that the application 104 may be updated. Additionally or alternatively, the update determination module 112 may check whether newer application 104 files are available. For instance, the update determination module 112 may communicate with a remote computing device to determine whether newer executable files, newer dynamically linked files and/or other newer files are available for the application 104. Additionally or alternatively, the update determination module 112 may use information from local media (e.g., storage, optical drive, removable media, etc.) to make this determination.

The new file retrieval module 108 may be used to retrieve one or more new files for the application 104. It should be noted that the phrase "new file retrieval module" refers to a module that is used to retrieve "new files" or files that were not on a computing device previously. Thus, the phrase "new file retrieval module" should not necessarily be understood as being included within the "new application" or the new instance of the application 104. In other words, the new file retrieval module 108 may be included in an "old application" or an old instance of the application 104. As used herein, a "file" may comprise computer instructions, code, data, etc. For example, the application 104 may use one or more executable files (e.g., .EXE files) and/or dynamically linked files (e.g., dynamic link libraries, .DLLs, etc.) to run. An executable file may include instructions and/or code that are executable by a computer or processor to perform a particular task. An executable file may also include data. A dynamically linked file may include instructions and/or code that are executable by a computer or processor to perform a particular task. Additionally or alternatively, a dynamically linked file may include data. A dynamically linked file may be accessed at run-time in order to perform a particular task and/or provide data. Before the application 104 is updated (for a current update, for example), it 104 may use one or more old executable files 122, one or more old dynamically linked files 124 and/or one or more other old files. More specifically, instructions, code and/or data included in one or more old executable files 122, in one or more old dynamically linked files 124 and/or in one or more other old files may be executed and/or used to run the non-updated or "old" application 104.

When one or more new executable files, new dynamically linked files and/or other new files are available for the application 104, the new file retrieval module 108 may retrieve (e.g., request, receive, etc.) the one or more new files. In one configuration, the new file retrieval module 108 may retrieve one or more new executable files 126, new dynamically linked files 128 and/or other new files from another (remote) computing device over a network. Additionally or alternatively, the new file retrieval module 108 may retrieve the new executable files 126, new dynamically linked files 128 and/or other new files from one or more local sources (e.g., local storage, a local optical drive, removable media, etc.). The new file retrieval module 108 may store the one or more new executable files 126, one or more new dynamically linked files 128 and/or one or more other new files in the directory 120. For example, new executable files 126, new dynamically linked files 128 and/or other files may be stored in one or more particular folders in the directory 120. As used herein, the term "folder" or "folders" may refer to a directory location, category and/or drawer. For example, a folder may be a virtual container used to contain one or more files.

The directory 120 may be implemented in hardware and/or software. For example, the directory 120 may store data, instructions, code, etc., at particular addresses in memory. The memory may comprise any device that is capable of storing information, such as a disk drive, optical media, removable media, network storage, solid-state drive, etc. In one configuration, the directory 120 comprises a file system with a hierarchical arrangement of directory "folders" where files may be stored. The directory 120 may store one or more old executable files 122, one or more old dynamically linked files 124 and/or one or more other "old" files. As used herein, the term "old files" may be used to refer to the one or more old executable files 122, one or more old dynamically linked files 124 and/or the one or more other old files. In one example, the old files 122, 124 may be used by or for the (old) application 104 before an update. It should be noted that the application 104 may use other files in the directory 120 that are not illustrated in FIG. 1.

The directory 120 may additionally or alternatively store one or more new executable files 126, one or more new dynamically linked files 128 and/or other "new" files. As used herein, the term "new files" may be used to refer to the one or more new executable files 126, one or more new dynamically linked files 128 and/or the one or more other new files. In one example, the new file retrieval module 108 may be used to download and store one or more new files 126, 128 in the directory 120. In some configurations, the one or more new files 126, 128 may be initially stored in one or more folders that are different from the one or more folders where the one or more old files 122, 124 are stored. However, for instance, after one or more of the old files 122, 124 are renamed by the file renaming module 110, the one or more new files 126, 128 may be moved into the same one or more folders as the one or more old files 122, 124.

In some configurations, the directory 120 may store one or more deferred commands 130. The deferred commands 130 may include, for example, a command for deleting one or more old files 122, 124 upon a reboot of the computing device 102. In one configuration, the deferred commands may be stored in a "PendingFileRename" operations registry key to delete the renamed files. Additionally or alternatively, deferred commands 130 may include parameters 114 that were originally passed to the old application 104 that are to be passed to the new application 104. Thus, some deferred commands 130 may be used once the application 104 is updated and/or later, such as after a reboot. Thus, for instance, a deferred command 130 may allow one or more files to be deleted as soon as the application 104 is updated and/or after reboot of the computing device 102.

For instance, the application 104 may be programmed to perform deferred commands 130, but may defer them until the application 104 is updated. Other examples of deferred commands 130 include commands to scan the computing device 102 for vulnerabilities (e.g., security threats, spyware, adware, malware, Trojans, worms, etc.). Since definitions for how vulnerabilities (e.g., threats, malware, etc.) are defined can change over time, the application 104 may make it a priority to update itself before agreeing to perform a scan request. In this way, the application 104 may scan properly.

In one example, some deferred commands 130 may be passed to the application 104 on a command line interface. Some of those commands may represent other configuration files that list more settings that the application 104 should use. The "old" copy of the application 104 may interpret any command line parameters as well as any settings in other configuration files. When the application 104 performs a self-update, it 104 may launch the "new" application 104 with the same command line or commands passed from the command line interface.

The file renaming module 110 may be used to rename one or more old executable files 122, one or more old dynamically linked files 124 and/or one or more other old files. The file renaming module 110 may rename one or more of the old executable files 122, old dynamically linked files 124 and/or other old files while they are in use. For example, even though an old executable file 122 is currently being used to run the application 104, the file renaming module 110 may rename the old executable file 122 while being used. For instance, the file renaming module 110 may change the name of one or more old executable files 122, old dynamically linked files 124 and/or other old files in the directory 120 (e.g., file system). In one configuration, a directory's 120 file system may maintain a database that includes file names. The file renaming module 110 may re-write the file name of one or more old executable files 122, old dynamically linked files 124 and/or other old files in the file system database.

In one configuration of the systems and methods disclosed herein, a Windows operating system may be used. In this configuration, Windows allows a file opened for read access to be renamed, even though it is in use. For example, an "old" executable file 122 may be renamed to "filename.uniqueid.old" (where "filename" is the original file name and "uniqueid" is a unique sequence of characters) to get it "out of the way" for new executable file(s) 126 that will be placed in the same directory 120 folder. Since the "old" application may have already loaded any dependent old dynamically linked files 124, they 124 may be renamed. If the application 104 were to attempt to load an old dynamically linked file 124 for the first time after it has been renamed it, then loading would fail. However, the application 104 may avoid this issue by loading any needed old dynamically linked files 124 before performing the self-update or avoiding opening any other old dynamically linked files 124 once the self-update is initiated. Additionally or alternatively, the self-update may be a priority task for the application 104 (that the application 104 performs first, for example) in order to avoid a loading failure.

The parameters 114 may include one or more parameters or data that are provided to (e.g., passed to) the application 104 and/or one or more parameters or data that are generated and/or used by the application 104. For example, these parameters 114 (being run by the application 104) may have nothing to do with whether or not the application 104 chooses to self-update (except in cases where there is a parameter that blocks the application 104 from self updating, for instance). In one configuration, the parameters 114 may be parameters used by the application 104 to run. For example, these parameters 114 may be entered on a command line interface in a sequence such as: "application.exe /parameterA /parameterB", where "application.exe" is an executable file and "parameterA" and "parameterB" are parameters 114. In other configurations, these parameters 114 may be provided in code when calling the application 114. Thus, these parameters 114 may be any information. Once the application 104 completes the self-update, it 104 may launch the new copy of itself 104 using the same parameters 114.

As described above, the application 104 may optionally include a setup module 116. The optional setup module 116 may be instructions, code and/or data that may be used to set up a "new" application 104. It should be noted that while the application 104 may be referred to as an "old" application 104 before it is updated, the application 104 may be referred to as a "new" application 104 upon updating. In some configurations, the setup module 116 may be used to configure the new application 104. Setting up an application 104 may include configuring certain aspects of the application 104, such as configuring addresses of new application files (e.g., dynamic link libraries), deleting old content files, obtaining (e.g., downloading) additional needed files, etc. Additionally or alternatively, the computing device 102 may use an optional setup application 118. For example, the setup application 118 may be used instead of or in addition to the optional setup module 116. As similarly described for the setup module 116, the setup application 118 may be used to set up a new application 104. In one configuration, the old application 104 launches the setup application 118. It should be noted that the setup module 116 may be included in the new application 104 or new instance of the application 104.

In one configuration, the setup logic may be placed in the "new" copy of the application 104 or in a new instance of the application 104. The "old" application 104 may first check with another device (e.g., a server on a network, and administrative system, etc.) to see if there are any new versions of files that it knows about. The old application 104 may download all these files and launch the "new" copy of itself 104. For instance, assume that an old executable file 122 did not change, but that a dependent old dynamically linked file 124 (e.g., a new dynamically linked file 128 was added). A new copy or instance of the old executable file 122 may be launched (e.g., the same copy that is running as the "old" application 104), but the new version of the application 104 would load the new dynamically linked file 128 because the old dynamically linked file 124 has been renamed "out of the way" and is not visible to the new application 104.

Once the new application 104 runs with the new dynamically linked file 128, it may perform a "reset" that indicates to the new application 104 to do anything necessary to make sure it 104 will run properly. This may include, for example, deleting old content files and such (the format of which files might have changed). The new application 104 may realize after the update that there are indeed other files that are now part of the "self-update" set that were not part of that set before. So, the new application 104 may download those files. If those files were not already in use by the new application 104, the new application 104 may simply continue running after downloading the files. However, if one or more files were in use, then the application 104 may repeat the procedure, launching a new copy of itself 104 after renaming those in-use files out of the way (and/or passing the parameters it was passed). In one configuration, the application 104 may only be allowed to attempt to self-update twice in a single instance. This may be because the "old" application 104 may have an out-of-date list of files that it 104 should be checking for to self-update completely. However, once the first phase has completed (which may include two major parts of the application 104 (e.g., the .EXE and .DLL files), then the next instance of the application 104 may be guaranteed to at least have an up to date list of what files to check for when doing a self-update.

In another configuration, the self-update logic may be placed in a separate application or program. In that case, the "old" application 104 may download the separate application or program (e.g., .EXE file) if it has changed and run it. Once this separate application returns success, the application 104 may just plan on launching a new copy of itself with the same command line. This approach may avoid the "self-update twice" issue discussed above.

For clarity, an example is given hereafter. In this example, assume that the application 104 is being executed (e.g., has been started and is currently running). The update determination module 112 in the self-update block/module 106 of the "old" application 104 communicates with a remote server and determines that a new executable file exists for the application 104 (and that an update should be performed). The self-update block/module 106 stores parameters 114 that are passed to the application 104. The "new file" retrieval module 108 (in the "old" application 104) downloads the new executable file 126 from the remote server. The new executable file 126 is initially stored in a folder that is different from the folder where the old executable file 122 is stored in the directory 120.

The file renaming module 110 renames the old executable file 122. After the old executable file is renamed, the new executable file 126 is moved or copied into the same folder as the old executable file 122. The old application 104 either launches the setup application 118 or uses the setup module 116 in order to set up the new application 104. After setup is complete, the old application 104 launches the new application 104 and passes parameters 114 to the new application 104. The old application 104 also stores a deferred command 130 to delete the old executable file 122 upon reboot. It should be noted that the old application 104 and new application 104 may be different instances of the application 104.

Figure 2:
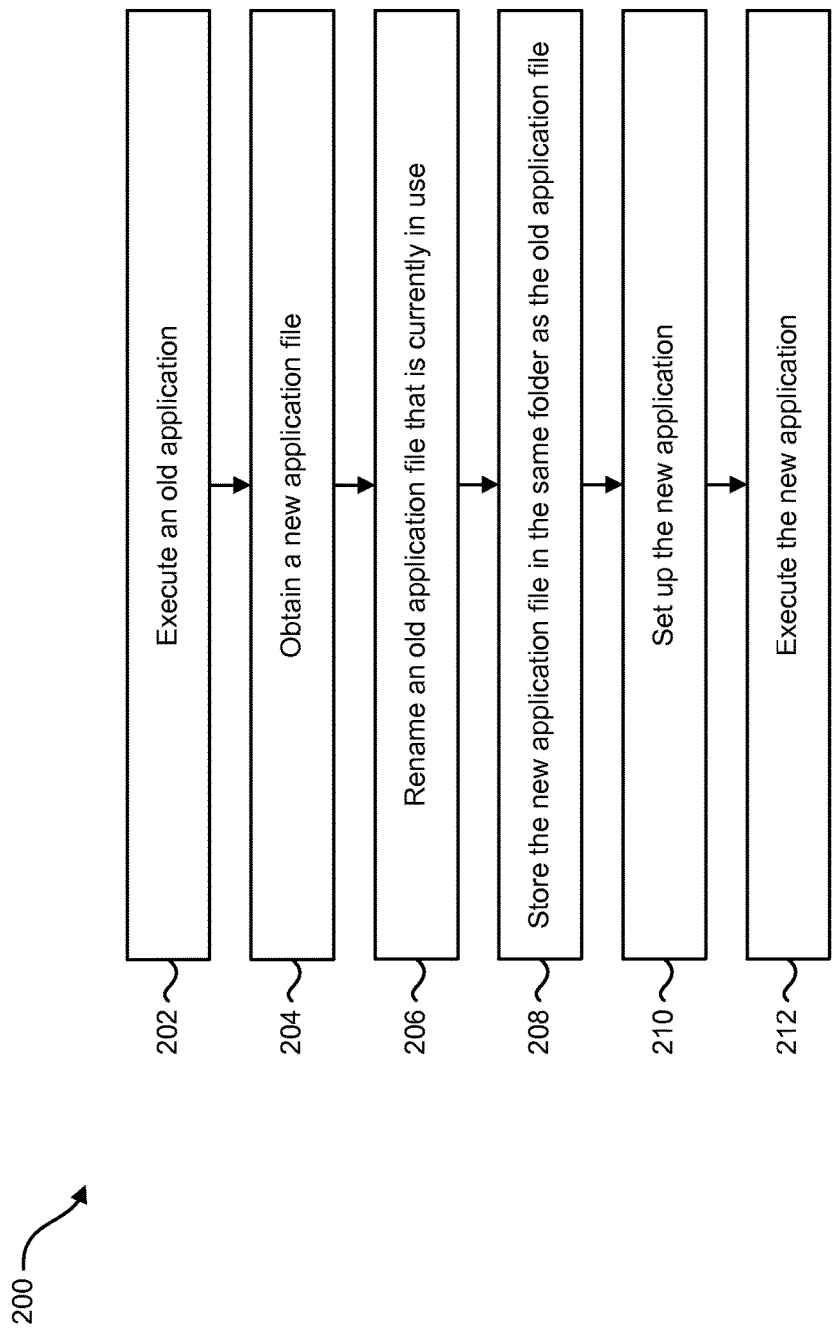
FIG. 2 is a flow diagram illustrating one configuration of a method for updating a running application on a computing device.

FIG. 2 is a flow diagram illustrating one configuration of a method 200 for updating a running application 104 on a computing device 102. A computing device 102 may execute 202 an old application 104. An old application 104 may be an application that has not been updated within a period of time. For example, an application 104 that has not been updated since installation or since a prior update may be considered to be an "old" application 104. When an old application 104 is executed, it 104 may use one or more old application files, such as one or more old executable files 122, one or more old dynamically linked files 124 and/or other old files.

The computing device 102 may obtain 204 a new application file. Examples of new application files include new executable files 126 (e.g., .EXE files), new dynamically linked files 128 (e.g., .DLL files) or any other "new" file used by an (updated or new) application 104. For example, the computing device 102 may download the new application file, copy it from removable media, etc. The new application file may be initially stored in a folder other than a folder where the old application file (e.g., a corresponding old application file that is designated for replacement) is stored.

The computing device 102 may rename 206 an old application file that is currently in use. For instance, the computing device 102 may modify the name of the old application file that is currently being used to run the old application 104. Examples of old application files include old executable files 122 (e.g., .EXE files), old dynamically linked files 124 (e.g., .DLL files) or any other "old" file used by an application 104. In one configuration, the computing device 102 may use a "MoveFile" or "MoveFileEx" function to rename the file.

The computing device 102 may store 208 the new application file in the same folder as the old application file. For example, the computing device 102 may copy the new application file into the same folder as the (corresponding) old application file.

The computing device 102 may set up 210 the new application. For example, the computing device 102 may configure certain application settings, such as configuring addresses of new application files (e.g., dynamic link libraries), deleting old content files, obtaining (e.g., downloading) additional needed files, etc. as described above.

The computing device 102 may execute 212 the new application. For example, the computing device 102 may run the new application 104 on its processor. More specifically, for instance, the computing device 102 may begin to execute instructions corresponding to the new application 104.

Figure 3:
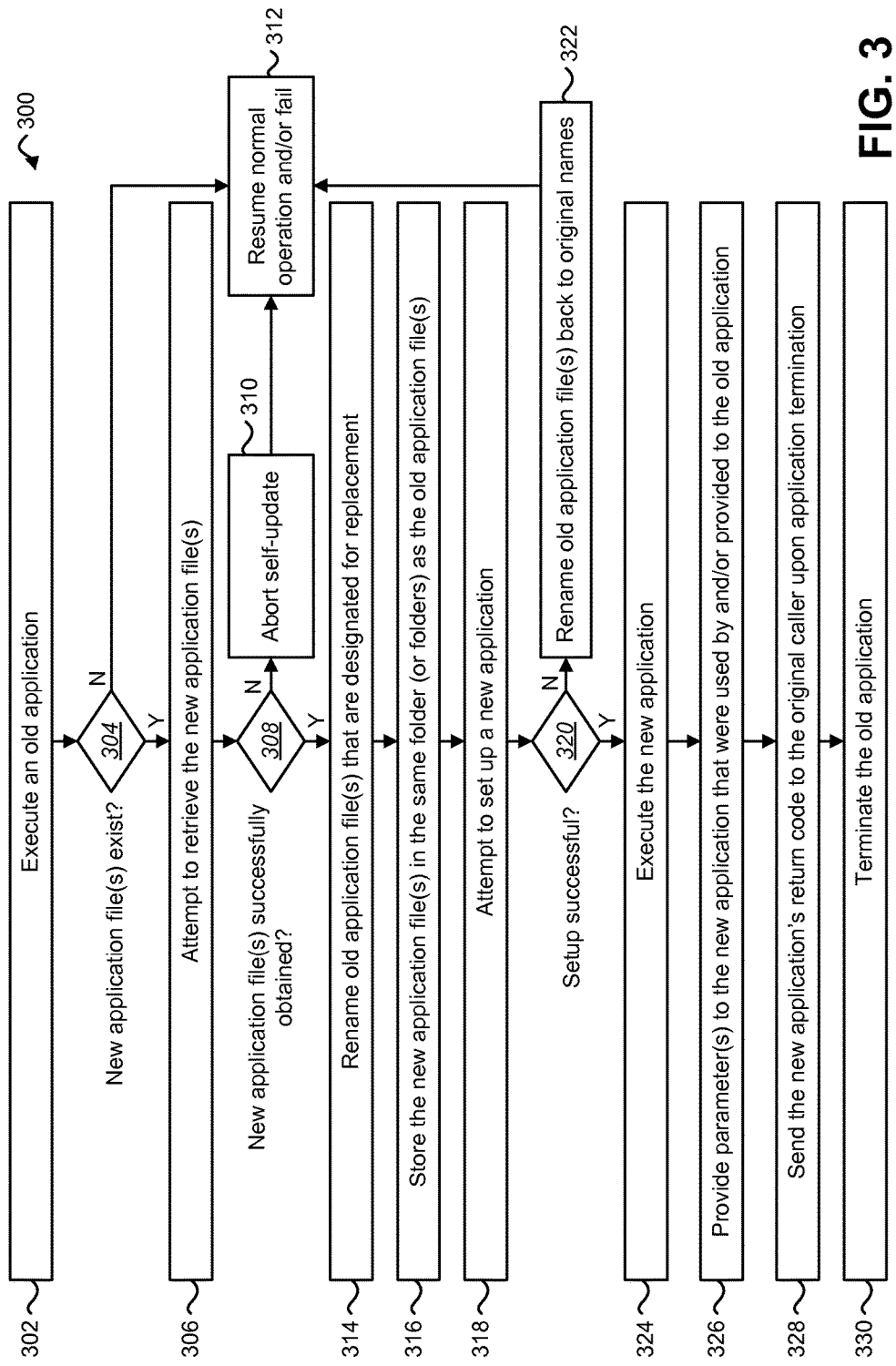
FIG. 3 is a flow diagram illustrating a more specific configuration of a method for updating a running application on a computing device.

FIG. 3 is a flow diagram illustrating a more specific configuration of a method 300 for updating a running application on a computing device 102. A computing device 102 may execute 302 an old application 104. An old application 104 may be an application that has not been updated within a period of time. For example, an application 104 that has not been updated since installation or since a prior update may be considered an "old" application 104.

The computing device 102 may determine 304 whether one or more new application files exist for an application 104. In one configuration, the computing device 102 may communicate with another computing device to make this determination 304. For example, the computing device 102 may query a remote server to determine whether any new application files exist for the application 104. Additionally or alternatively, the computing device 102 may compare a version number of the application 104 with the latest version number available on the remote server. If the latest version number is higher than the application 104 version number, the computing device 102 may determine 304 that a new application file exists. In other configurations, the computing device 102 may obtain some other indication that a new application file exists by receiving a message, searching a database and/or inspecting a directory, for example.

If the computing device 102 determines 304 that one or more new application files do not exist, then the computing device 102 may resume 312 normal operation and/or fail 312. For example, the computing device 102 may continue to function without an application update. Additionally or alternatively, the computing device 102 may provide a failure message. For instance, the computing device 102 may display a failure message and/or send a failure notification to another device. In one configuration, the computing device 102 sends a failure message to an administrative system using a network.

If the computing device 102 determines 304 that one or more new application files exist, then the computing device 102 may attempt 306 to retrieve the one or more new application files. For example, the computing device 102 may search for and/or request the one or more new application files. For instance, the computing device 102 may communicate with one or more other computing devices using a network (e.g., an intranet, the Internet, etc.) in order to determine whether the one or more other computing devices may provide the one or more new application files and/or to request the one or more new application files from them. The computing device 102 may additionally or alternatively search local media (e.g., local drive, removable media, optical drive, etc.) for the one or more new application files. The computing device 102 may begin retrieval (e.g., download, transfer, copying) of the one or more new application files from a remote computing device and/or from local media.

The computing device 102 may determine 308 whether the one or more new application files was/were successfully obtained. For example, the computing device 102 may determine 308 whether all of the new application files were found, retrieved, received and/or copied without error. If not all of the new application files were successfully obtained, then the computing device 102 may abort 310 the self-update. For instance, the computing device 102 may discontinue self-update procedures. The computing device 102 may then resume 312 normal operation and/or fail 312. In one configuration, the computing device 102 may continue to function without an application update. Additionally or alternatively, the computing device 102 may provide a failure message. For instance, the computing device 102 may display a failure message, provide a failure indicator to an application and/or send a failure notification to another device. For instance, the computing device 102 may send a failure message to an administrative system using a network.

If the computing device 102 determines 308 that all of the one or more new application files were successfully obtained, the computing device 102 may rename 314 one or more old application files that are designated for replacement. One or all of the one or more old application files that are designated for replacement may be in use when the computing device 102 renames 314 them. An old application file may be "in use" if it is currently loaded into the old application's 104 process space. Additionally or alternatively, the old application file may be "in use" if it contains code and/or data that is being used by the (currently running) old application 104. In one configuration, an old application file may be "in use" if it is "open" in Windows terminology. For instance, an "open" file may not be allowed to be deleted (by an Operating System (OS), for example), but a rename may still be possible. Typically, an "open" file may not be writeable or changeable, though a rename may still be allowed (by the OS, for example). An old application file may be designated for replacement if the new application file(s) is an update to the old application file, is supposed to function in place of the old application file and/or has the same name as the old application file, etc. For example, the old application 104 may keep a list of files that should be "up to date". In one configuration, the application 104 queries another device (e.g., a server on a network, an administrative system, etc.) for the latest version of files on the list. In another configuration, the application 104 may request the list from another device. In this way, the list may be kept accurate. In a more specific configuration, the list may become "stale." In this case, a "two-pass" self-update may be required. For example, the "new" application 104 may determine that there are still some out-of-date files and may choose to download new files and re-run itself 104.

The computing device 102 may rename 314 the one or more old application files that are designated for replacement by modifying the file name(s) of the old application file(s). For example, the computing device 102 may modify one or more file names in a file system. In one configuration, the computing device 102 may use a Windows Platform Software Development Kit (SDK) "MoveFile" or "MoveFileEx" function to rename all currently in-use files that are targeted for replacement by the new application installation.

The computing device 102 may store 316 the one or more new application files in the same folder or folders as the (corresponding) one or more old application files. For example, each of the new application files corresponding to the old application files that are targeted for replacement may be placed in the same folder as the old application files that they are going to replace. In one configuration, the new application file(s) are copied into the same folder(s) as the old application file(s) (from a folder that they were downloaded to, for example).

The computing device 102 may attempt 318 to set up a new application 104 (that uses the new application file(s), for example). In one configuration, the old application 104 launches a setup application 118 in order to set up the new application 104. In another configuration, the old application 104 may use a setup module 116 to set up the new application 104. For example, the computing device 102 may initiate or begin setup procedures for the new application 104.

The computing device 102 may determine 320 whether the setup was successful. For example, the setup module 116 and/or setup application 118 may notify the computing device 102 (e.g., return a code to the caller of the setup module 116 or setup application 118) indicating whether or not setup was successful. In one configuration, setup may be successful if the files in the file list (of the old application 104) are successfully replaced. This may be considered a "point of no return." The old application 104 may then run the new application with a "/reset" to make sure it gets rid of any data that is not compatible with the new application 104. This command may not be allowed to fail. After the reset, the old application may run the new application with the parameters the old application was originally passed.

If the computing device 102 determines 320 that setup was not successful, then the computing device 102 may rename 322 the one or more old application files back to their original names. For example, the computing device 102 (e.g., file renaming module 110) may restore the original file names to the old application files. More specifically, those old application file names that have been modified may be restored to their original names. In this case, for instance (if the setup procedure has to fall back because of a rename failure), the renaming of the new application files may be undone (e.g., an "undo" command is performed), which may rename the new application files back to a ".new" or ".tmp" extension, for example. Then, the old application file(s) may be renamed back to their original filenames as well. It should be noted that if this procedure fails (in this phase), the application 104 may be put into an indefinitely broken state, which may requiring a third-party setup to fix the application 104. The computing device 102 may then resume 312 normal operation and/or fail 312. For example, the computing device 102 may continue to function without an application update. Additionally or alternatively, the computing device 102 may provide a failure message. For instance, the computing device 102 may display a failure message and/or send a failure notification to another device. In one configuration, the computing device 102 sends a failure message to an administrative system using a network (e.g., Local Area Network (LAN), the Internet, etc.).

If the computing device 102 determines 320 that setup was successful, then the computing device 102 may execute 324 the new application. In one configuration, the old application 104 launches the new application 104. For example, the old application 104 may include a function that calls the new application 104, which may cause the computing device 102 to execute the new application 104.

The computing device 102 may provide 326 one or more parameters to the new application 104 used by and/or provided to the old application 104. For example, the computing device 102 may provide 326 one or more parameters to the new application 104 that were provided to the old application 104 (when the old application 104 was launched or commanded to perform some operation, for example). For instance, the old application 104 may store parameters that were provided to it 104 when it 104 was launched. The old application 104 may provide these parameters to the new application 104 when it 104 is launched. Additionally or alternatively, the computing device 102 may provide 326 one or more parameters to the new application that were being used and/or were generated by the old application 104.

The computing device 102 may optionally send (e.g., return) 328 the new application's return code to the original caller upon application termination. For example, when the new application is terminated, it provides a code. For instance, the new application 104 may provide a return code to the old application 104, which launched the new application 104. This code may be provided to the original caller upon termination of the new application 104. In one configuration, the original caller may be another application (e.g., an "agent") on the computing device 102. For instance, the original caller may be an agent application on the computing device 102. The agent application may be a network-listener that waits for commands to be submitted to it (from another device on a network, for example). The agent may wait for the requested command to finish and then returns the application's 104 return code back over the network to a requester. In some configurations, a requester may be an application on a networked device, such as a server or administrative system. For instance, the requester may be a scheduler program on an administrative system that is trying to communicate with a limited number of managed nodes simultaneously. In one example, the old application 104 may wait for the new application 104 to finish and may then return the return code that the new application 104 returned to the old application 104 back to the original caller and/or requester.

The computing device 102 may terminate 330 the old application 104. For example, the old application 104 may wait for the new application 104 to terminate. Once the new application 104 is terminated, the old application 104 may be terminated. For example, the old application 104 may download the new application 104, launch the new application 104 (passing it the same parameters that the old application 104 was passed), wait for the new application 104 to terminate and then terminate itself (the old application 104), returning the same return code that the new application 104 returned.

Figure 4:
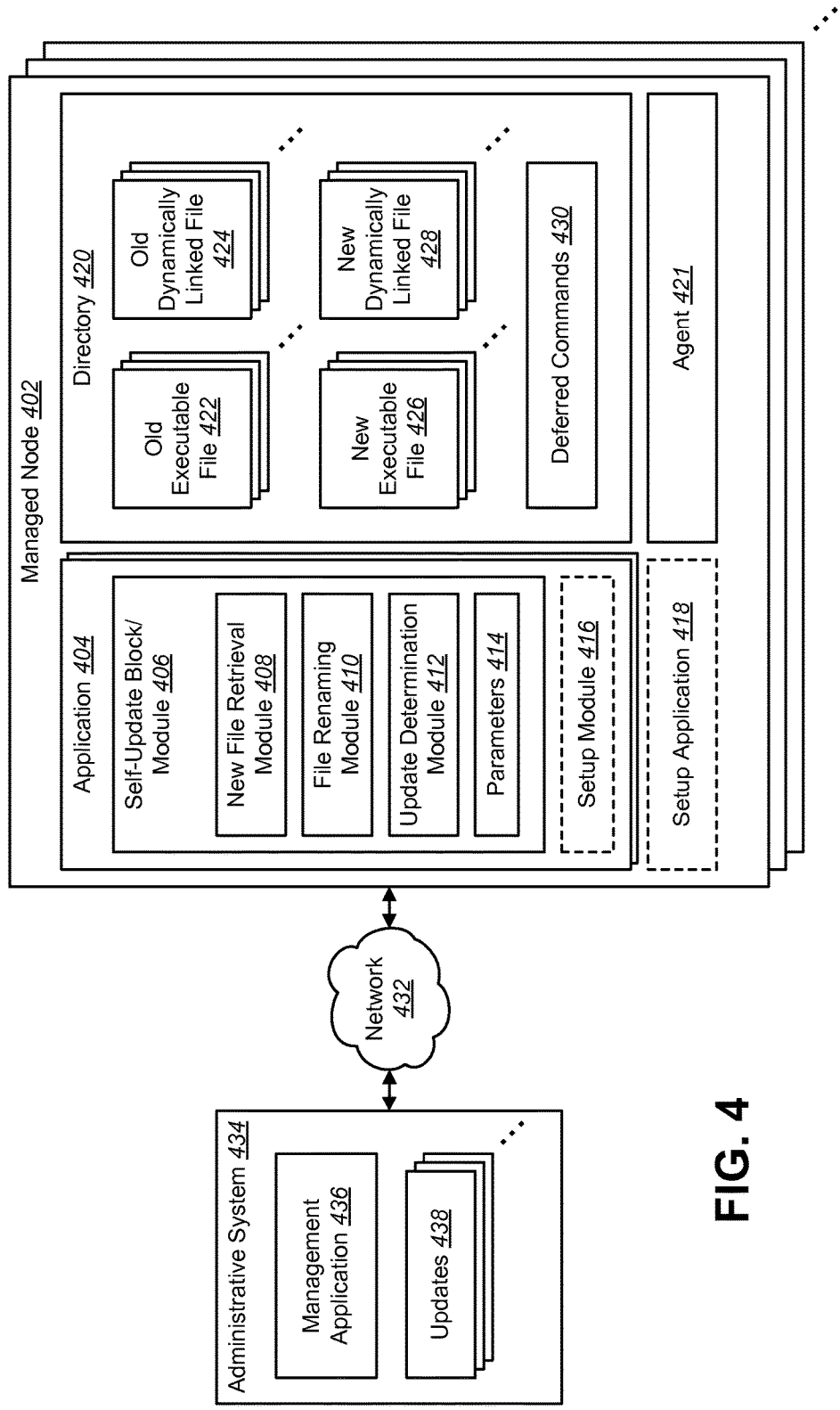
FIG. 4 is a block diagram illustrating one configuration of one or more managed nodes in which systems and methods for updating a running application may be implemented.

FIG. 4 is a block diagram illustrating one configuration of one or more managed nodes 402 in which systems and methods for updating a running application may be implemented. Examples of a managed node 402 include desktop computers, laptop computers, supercomputers, servers, cellular phones, smartphones, tablet devices, e-readers, gaming devices, etc. Each managed node 402 may include an application 404, a directory 420 and/or an agent 421. Optionally, the managed node 402 may include a setup application 418. The agent 421 may be a program or application that is used in conjunction with an administrative system 434 in order to perform operations on the one or more managed nodes 402. In some configurations, the agent 421 may be the application 404. In other configurations, the agent 421 may be a separate application.

The application 404 may be software, a program, computer instructions, code, etc., that is executed or runs on each managed node 402. For example, instructions for the application 404 may be stored in memory and executed by a processor on the managed node 402 in order to execute or run the application 404. In one configuration, the application 404 is used to scan the managed node 402 for vulnerabilities (e.g., viruses, spyware, adware, malware, Trojans, worms, bugs, etc.). The application 404 may include a self-update block/module 406 and/or an optional setup module 416. The self-update block/module 406 may be implemented in software, hardware or a combination of both. For instance, the self-update block/module 406 may comprise instructions, code, software, etc., executed on a processor.

The self-update block/module 406 may be used to update the application 404. An "update" may modify the application 404. For example, an "update" may include new versions, patches, updates, upgrades, bug fixes and/or definitions, etc., for the application 404. An "update" may additionally or alternatively include a rollback or removal of one or more versions of the application 404, patches, updates, upgrades, bug fixes and/or definitions, etc. In one configuration, for instance, an update may include new vulnerability (e.g., virus, malware, adware, spyware, Trojans, worms, etc.) definitions and/or code used to address (e.g., remove, fix) the vulnerabilities.

The self-update block/module 406 may include a new file retrieval module 408, a file renaming module 410, an update determination module 412 and/or one or more parameters 414. The update determination module 412 may be used to determine whether any updates are available for the application 404 and/or whether any updates should be applied to the application 404. In one configuration, the update determination module 412 checks whether the application 404 is up to date with the latest available version, patches, updates, upgrades, bug fixes and/or definitions, etc. For example, the update determination module 412 may communicate with the administrative system 434 over a network 432 to make this determination. More specifically, for instance, the update determination module 412 may request a latest version number from the administrative system 434 and/or some other device on the network (e.g., a website) and compare that number with the version number of the current application 404. If there is a newer version number of the application 404 available, the update determination module 412 may determine that the application 404 may be updated. Additionally or alternatively, the update determination module 412 may check whether newer application 404 files are available. For instance, the update determination module 412 may communicate with the administrative system 434 to determine whether newer executable files, newer dynamically linked files and/or other newer files are available for the application 404. These newer executable files, newer dynamically linked files and/or other newer files may be stored on the administrative system 434 as one or more updates 438, for example. Additionally or alternatively, the update determination module 412 may use information from local media (e.g., storage, optical drive, removable media, etc.) to make this determination.

The new file retrieval module 408 (on the old application 404) may be used to retrieve one or more new files for the application 404. As used herein, a "file" may be computer instructions, code, data, etc. For example, the application 404 may use one or more executable files (e.g., .EXE files) and/or dynamically linked files (e.g., dynamic link libraries, .DLLs, etc.) to run. Before the application 404 is updated, it 404 may use one or more old executable files 422, one or more old dynamically linked files 424 and/or one or more other old files. More specifically, instructions, code and/or data included in one or more old executable files 422, in one or more old dynamically linked files 424 and/or in one or more other old files may be executed and/or used to run the non-updated or "old" application 404.

When one or more new executable files, new dynamically linked files and/or other new files are available for the application 404, the new file retrieval module 408 may retrieve (e.g., request, receive, etc.) the one or more new files. In one configuration, the new file retrieval module 408 may retrieve the new executable files 426, new dynamically linked files 428 and/or other new files from the administrative system 434 using the network 432. For example, the new file retrieval module 408 may request one or more new file updates 438 from the administrative system 434. More specifically, the one or more updates 438 may include one or more new executable files 426, one or more new dynamically linked files 428 and/or one or more other new files. The administrative system 434 may send or transmit the one or more updates 438 to one or more managed nodes 402 using the network 432, which may be received by the one or more managed nodes 402.

In another configuration, the new file retrieval module 408 may retrieve the new executable files 426, new dynamically linked files 428 and/or other new files from some other device using the network 432. For example, the new file retrieval module 408 may request and/or receive the new executable files 426, new dynamically linked files 428 and/or other new files from a server or other computing device that is connected to the network 432. For instance, the new file retrieval module 408 may download one or more new files 426, 428 from an Internet website.

Additionally or alternatively, the new file retrieval module 408 may retrieve the new executable files 426, new dynamically linked files 428 and/or other new files from one or more local sources (e.g., local storage, a local optical drive, removable media, etc.). The new file retrieval module 408 may store the one or more new executable files 426, one or more new dynamically linked files 428 and/or one or more other new files in the directory 420. For example, new executable files 426, new dynamically linked files 428 and/or other files may be stored in one or more particular folders in the directory 420. As used herein, the term "folder" or "folders" may refer to a directory location, category and/or drawer. For example, a folder may be a virtual container used to contain one or more files.

The directory 420 may be implemented in hardware and/or software. For example, the directory 420 may store data, instructions, code, etc., at particular addresses in memory. The memory may comprise any device that is capable of storing information, such as a disk drive, optical media, removable media, network storage, solid-state drive, etc. In one configuration, the directory 420 comprises a file system with a hierarchical arrangement of directory "folders" where files may be stored. The directory 420 may store one or more old executable files 422, one or more old dynamically linked files 424 and/or one or more other "old" files. As used herein, the term "old files" may be used to refer to the one or more old executable files 422, one or more old dynamically linked files 424 and/or the one or more other old files. In one example, the old files 422, 424 may be used by or for the application 404 before an update. It should be noted that the application 404 may use other files in the directory 420 that are not illustrated in FIG. 4.

The directory 420 may additionally or alternatively store one or more new executable files 426, one or more new dynamically linked files 428 and/or other "new" files. As used herein, the term "new files" may be used to refer to the one or more new executable files 426, one or more new dynamically linked files 428 and/or the one or more other new files. In one example, the new file retrieval module 408 may be used to download and store one or more new files 426, 428 in the directory 420. In some configurations, the one or more new files 426, 428 may be initially stored in one or more folders that are different from the folders where the one or more old files 422, 424 are stored. However, after one or more of the old files 422, 424 are renamed by the file renaming module 410, the one or more new files 426, 428 may be moved into the same one or more folders as the one or more old files 422, 424.

In some configurations, the directory 420 may store one or more deferred commands 430. The deferred commands 430 may include, for example, a command for deleting one or more old files 422, 424 upon a reboot of the managed node 402. In one configuration, the deferred commands may be stored in a "PendingFileRename" operations registry key to delete the renamed files.

The file renaming module 410 may be used to rename one or more old executable files 422, one or more old dynamically linked files 424 and/or one or more other old files. The file renaming module 410 may rename one or more of the old executable files 422, dynamically linked files 424 and/or other old files while they are in use. For example, even though an old executable file 422 is currently being used to run the application 404, the file renaming module 410 may rename the old executable file 422 while being used. For instance, the file renaming module 410 may change the name of one or more old executable files 422, old dynamically linked files 424 and/or other old files in the directory 420 (e.g., file system). In one configuration, a directory's 420 file system may maintain a database that includes file names. The file renaming module 410 may re-write the file name of one or more old executable files 422, old dynamically linked files 424 and/or other old files in the file system database.

The parameters 414 may include one or more parameters or data that are provided to (e.g., passed to) the application 404 and/or one or more parameters or data that are generated and/or used by the application 404.

As described above, the application 404 may optionally include a setup module 416. The optional setup module 416 may be instructions, code and/or data that may be used to set up a "new" application 404. It should be noted that the application 404 may be referred to as an "old" application 404 before it is updated, while the application 404 may be referred to as a "new" application 404 after being updated. In some configurations, the setup module 416 may be used to configure the new application 404. Setting up an application 404 may include configuring certain aspects of the application 404, such as configuring addresses of new application files (e.g., dynamic link libraries), deleting old content files, obtaining (e.g., downloading) additional needed files, etc. as described above. Additionally or alternatively, the managed node 402 may use an optional setup application 418. For example, the setup application 418 may be used instead of or in addition to the optional setup module 416. As similarly described for the setup module 416, the setup application 418 may be used to set up a new application 404. In some configurations, the setup application 418 may be launched by the old application 404.

The administrative system 434 may be a computing device that is used to manage the one or more managed nodes 402 that are connected to the network 432. Examples of administrative systems 434 include servers, desktop computers, laptop computers, tablet devices, etc. Examples of the network 432 include Local Area Networks (LANs), Wide Area Networks (WANs), the Internet, etc. The administrative system 434 may include a management application 436 and one or more updates 438. Examples of updates 438 include new files (e.g., new executable files 426, new dynamically linked files 428 and/or other new files). The administrative system 434 may send one or more updates 438 to the one or more managed nodes 402. The management application 436 may be used to perform management functions related to the one or more managed nodes 402.

More specifically, the administrative system 434 may be used to perform operations on the one or more managed nodes 402. In some configurations, the administrative system 434 may be used to manage functionality such as security, accessibility, maintenance, etc., of the managed nodes 402. For example, the administrative system 434 may be used to update the application 404 on each of the managed nodes 402. In some instances, the administrative system 434 may only update a given number of managed nodes 402 at a time. If the administrative system 434 were to try updating too many managed nodes 402 at a time, for instance, the communications between the administrative system 434 and the one or more managed nodes 402 could overwhelm the network 432.

In order to alleviate this problem, the administrative system 434 may allow only a certain number of updates to be performed at one time. When the systems and methods disclosed herein are not used, problems in managing the number of updates occurring at the same time may arise. For example, the administrative system 434 may begin a certain number of application 404 updates on one or more managed nodes 402. The administrative system 434 may wait until an application 404 has terminated before beginning another update. For example, the managed node 402, the agent 421 and/or the application 404 may send a notification to the administrative system 434 indicating that the application has terminated. However, when the systems and methods disclosed herein are not used, the administrative system 434 may erroneously begin another update before an application 404 update has finished. This may occur when the application 404 is terminated before completing the update process. In one scenario, this may lead to the administrative system 434 performing too many application 404 updates at once, thus overwhelming the network 432. This may cause a decrease in performance of the administrative system 434, the network 432 and/or the one or more managed nodes 402.

However, according to the systems and methods disclosed herein, the application 404 may continue to run while being updated. Thus, the administrative system 434 may avoid beginning another update before an application 404 update is actually complete. More specifically, the application 404 may not terminate until the update is actually complete, allowing the administrative system 434 to correctly begin another update when a previous update is complete.

For clarity, one example of the systems and methods disclosed herein is given hereafter. Assume, for example, that the administrative system 434 is configured to schedule and update vulnerability scanning applications 404 one each of the managed nodes 402. Assume that the scanning application 404 is running or being executed at this point. For example, the managed node 402 is executing an old executable file 422 in order to run the application 404. The administrative system 434 (using the management application 436, for example) sends a command (e.g., message) to a number of managed nodes 402 indicating that the scanning applications 404 should check for an update 438.

The agent 421 and/or the application 404 may receive this command. For example, if the agent 421 receives this command, it 421 may pass the command to the application 404. This command may be, for example, a function call to the application 404. The application 404 uses its self-update block/module 406 to begin the self-update procedure. The self-update block/module 406 uses the update determination module 412 to check for any updates to the application 404. The managed node 402 sends a message to the administrative system 434 and/or to some other device on the network 432 to determine whether the application 404 may be updated. In this example, the managed node 402 receives a message indicating that a new executable file 426 is available for the application 404. The new file retrieval module 408 is then used to request the new executable file 426 from the administrative system 434 updates 438. The administrative system 434 sends the requested new executable file 426 to the requesting managed node 402.

The managed node 402 receives and stores (e.g., downloads) the new executable file 426 in a folder that is different from the folder where the old executable file 422 is stored. The managed node 402 then uses the file renaming module 410 to rename to the old executable file 422 that is currently being executed by the managed node 402. The managed node 402 then copies the new executable file 426 into the same folder as the old executable file 422. The "old" application 404 then either launches the setup application 418 to setup the "new" application 404 or uses the setup module 416 to perform the setup task.

When the "new" application 404 is successfully set up, the old application 404 launches the new application 404 and may pass one or more parameters 414 that the old application 404 had received or was using. The managed node 402 may also store one or more deferred commands 430 used to delete the old executable file 422 upon reboot. When the new application 404 is terminated (e.g., when it 404 finishes its task(s) and/or is terminated by another application or a user), its return code may be passed to the original caller. For example, if the agent 421 called the application 404, the return code may be provided to the agent 421, which may report to the administrative system 434 that the (new) application 404 has been terminated. In another configuration, the return code may be passed to the administrative system 434. When the administrative system 434 determines (e.g., is notified) that the new application 404 has been terminated, the administrative system 434 may begin the updating procedure for another application 404 and/or managed node 402.

Figure 5:
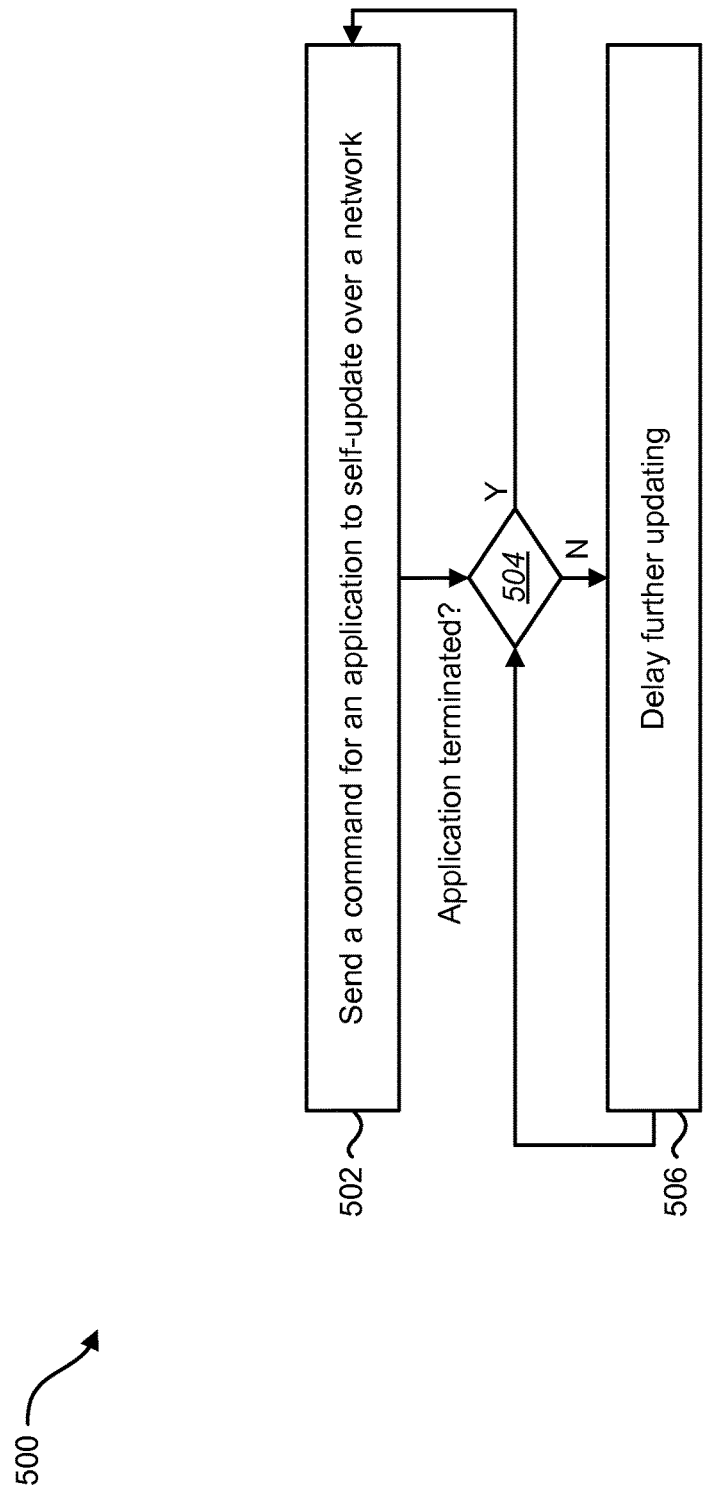
FIG. 5 is a flow diagram illustrating one configuration of a method for updating one or more running applications over a network.

FIG. 5 is a flow diagram illustrating one configuration of a method 500 for updating one or more running applications over a network. The administrative system 434 may send 502 a command for an application 404 to self-update over a network 432. For example, the administrative system 434 may send a message to an agent 421 and/or an application 404 using a network 432 that instructs the application 404 to perform a self-update. In some configurations, the administrative system 434 may send 502 several commands to several managed nodes 402 indicating that their respective applications 404 should perform a self-update.

The administrative system 434 may determine 504 whether an application 404 is terminated. For example, the administrative system 434 may receive a message indicating that an application 404 that has been instructed to perform a self-update has been terminated or is no longer running. In one configuration, the administrative system 434 may send a status request to a managed node 402 (e.g., an agent 421 and/or an application 404). The managed node 402 (e.g., an agent 421) may return a message indicating that the application has been terminated. In one configuration, the administrative system 434 may assume that an application 404 has been terminated if the application does not respond to a status request.

If the administrative system 434 determines 504 that the application 404 has been terminated, the administrative system 434 may send 502 a (another) command for an application 404 to self-update over the network. For example, the administrative system 434 may send 502 the command to a different managed node 402. Additionally or alternatively, the administrative system 434 may send 502 the command that is applicable to another application on the same managed node 402.

If the administrative system 434 determines 504 that the application 404 is not terminated, then the administrative system 434 may delay 506 further updating. For example, the administrative system 434 may not attempt to send further commands and/or may not perform additional activities over the network 432 for a period of time and/or until the administrative system 434 receives a message, etc. After delaying 506, the administrative system 434 may return to determining 504 whether the application 404 is terminated. Operation may continue in this fashion until all of the (designated) applications on the managed nodes 402 on the network 432 are updated, until an update has been attempted for every managed node 402 and/or until some other event occurs (e.g., operation is discontinued or suspended by a user).

Figure 6:
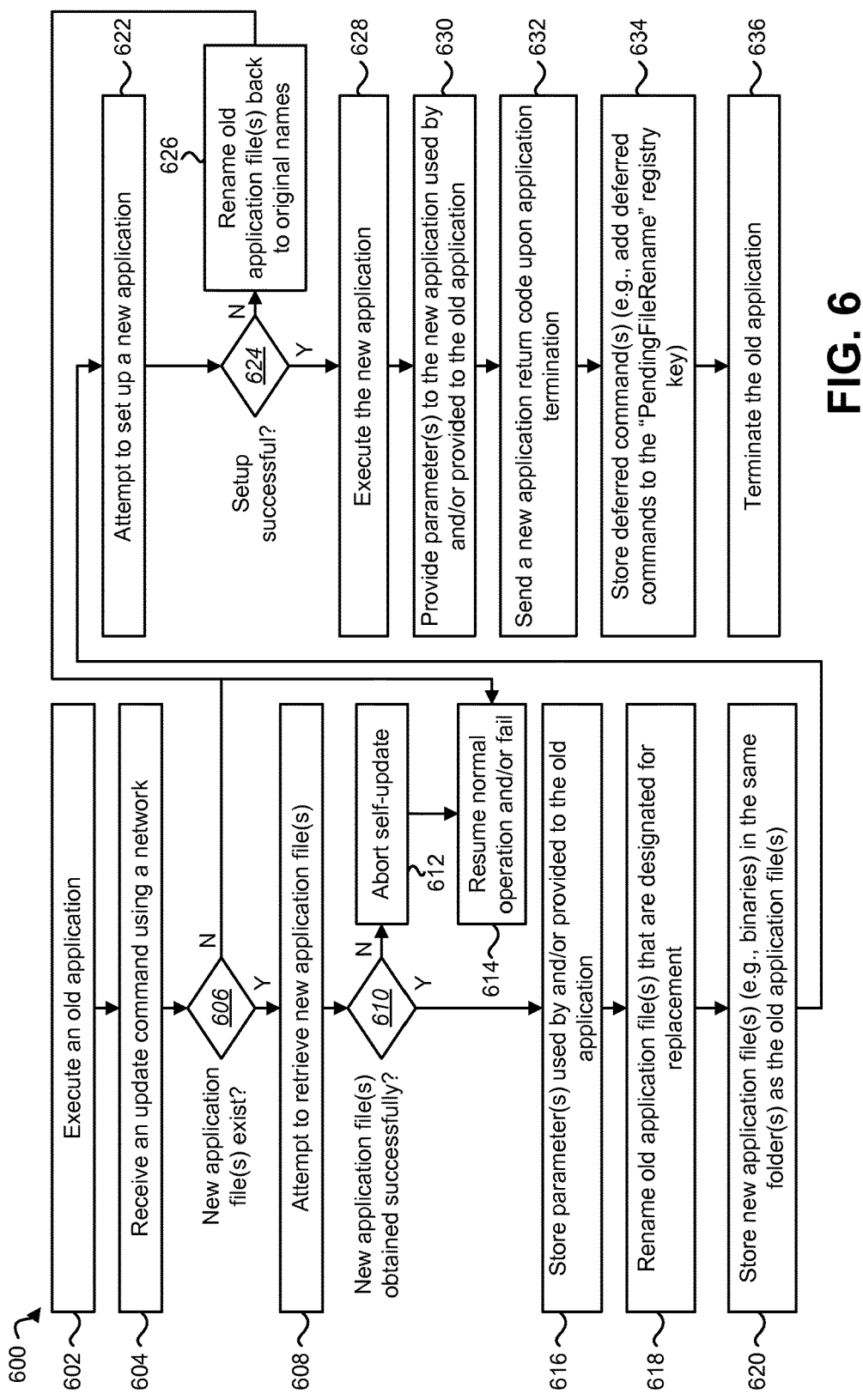
FIG. 6 is a flow diagram illustrating one configuration of a method for updating a running application on a managed node.

FIG. 6 is a flow diagram illustrating one configuration of a method 600 for updating a running application on a managed node 402. A managed node 402 may execute 602 an old application 404. An old application 404 may be an application that has not been updated within a period of time. For example, an application 404 that has not been updated since installation or since a prior update may be considered to be an "old" application 404.

The managed node 402 may receive 604 an update command using a network 432. For example, the managed node 402 may receive 604 an update command from an administrative system 434. In one configuration, the command may be received by an agent 421 and passed to the old application 404. The network 432 may be a Local Area Network (LAN), the Internet and/or some other network.

The managed node 402 may determine 606 whether one or more new application files exist for an application 404. In one configuration, the managed node 402 may communicate with the administrative system 434 or some other computing device to make this determination 606. For example, the managed node 402 may send a message over the network 432, querying the administrative system 434 whether any new application files exist for the application 404. Additionally or alternatively, the managed node 402 may compare a version number of the application 404 with the latest version number available on the administrative system 434 or some other computing device. If the latest version number is higher than the application 404 version number, the managed node 402 may determine 606 that a new application file exists. In other configurations, the managed node 402 may obtain some other indication that a new application file exists by receiving a message, searching a database and/or inspecting a directory, for example.

If the managed node 402 determines 606 that one or more new application files do not exist, then the managed node 402 may resume 614 normal operation and/or fail 614. For example, the managed node 402 may continue to function without an application update. Additionally or alternatively, the managed node 402 may provide a failure message. For instance, the managed node 402 may display a failure message and/or send a failure notification to the agent 421 and/or the administrative system 434 (using the network 432, for example).

If the managed node 402 determines 606 that one or more new application files exist, then the managed node 402 may attempt 608 to retrieve the one or more new application files. For example, the managed node 402 may search for and/or request the one or more new application files. For instance, the managed node 402 may communicate with the administrative system 434 and/or one or more other computing devices using a network 432 (e.g., an intranet, the Internet, etc.) in order to determine whether the administrative system 434 and/or the one or more other computing devices may provide the one or more new application files and/or to request the one or more new application files from them. The managed node 402 may additionally or alternatively search local media (e.g., local drive, removable media, optical drive, etc.) for the one or more new application files. The managed node 402 may begin retrieval (e.g., download, transfer, copying) of the one or more new application files from the administrative system 434, a remote computing device and/or from local media.

The managed node 402 may determine 610 whether the one or more new application files was/were successfully obtained. For example, the managed node 402 may determine 610 whether all of the new application files were found, retrieved, received and/or copied without error. If not all of the new application files were successfully obtained, then the managed node 402 may abort 612 the self-update. For instance, the managed node 402 may discontinue self-update procedures. The managed node 402 may then resume 614 normal operation and/or fail 614. In one configuration, the managed node 402 may continue to function without an application update. Additionally or alternatively, the managed node 402 may provide a failure message. For instance, the managed node 402 may display a failure message and/or send a failure notification to another device and/or program (e.g., agent 421). For instance, the managed node 402 may send a failure message to the administrative system 434 using the network 432.

If the managed node 402 determines 610 that all of the one or more new application files were successfully obtained, the managed node 402 may store 616 one or more parameters 414 used by and/or provided to the old application 404. For example, the managed node 402 may store 616 one or more parameters 414 that were passed to the old application 404 and/or one or more parameters 414 that were used and/or generated by the old application 404.

The managed node 402 may rename 618 one or more old application files that are designated for replacement. One or all of the one or more old application files that are designated for replacement may be in use when the managed node 402 renames 618 them. An old application file may be "in use" if it is currently loaded into the old application's 404 process space. Additionally or alternatively, the old application file may be "in use" if it contains code and/or data that is being used by the (currently running) old application 404. An old application file may be designated for replacement if the new application file(s) is an update to the old application file, is supposed to function in place of the old application file and/or has the same name as the old application file, etc.

The managed node 402 may rename 618 the one or more old application files that are designated for replacement by modifying the file name(s) of the old application file(s). For example, the managed node 402 may modify one or more file names in a file system. In one configuration, the managed node 402 may use a Windows Platform Software Development Kit (SDK) "MoveFile" or "MoveFileEx" function to rename all currently in-use files that are targeted for replacement by the new application installation.

The managed node 402 may store 620 the one or more new application files (e.g., binaries) in the same folder or folders as the (corresponding) one or more old application files. For example, each of the new application files corresponding to the old application files that are targeted for replacement may be placed in the same folder as the old application files that they are going to replace. For instance, the new application file(s) may be copied into the same folder(s) as the old application file(s) (from a folder that they were downloaded to, for example). In one configuration, the one or more new application files include binary (e.g., .BIN) files.

The managed node 402 may attempt 622 to set up a new application 404 (that uses the new application file(s), for example). In one configuration, the old application 404 launches a setup application 418 in order to set up the new application 404. In another configuration, the old application 404 may use a setup module 416 to set up the new application 404. For example, the managed node 402 may initiate or begin setup procedures for the new application 404.

The managed node 402 may determine 624 whether the setup was successful. For example, the setup module 416 and/or setup application 418 may notify the managed node 402 (e.g., return a code to the caller of the setup module 416 or setup application 418) indicating whether or not setup was successful.

If the managed node 402 determines 624 that setup was not successful, then the managed node 402 may rename 626 the one or more old application files back to their original names. For example, the managed node 402 may restore the original file names to the old application files. More specifically, those old application file names that have been modified may be restored to their original names. The managed node 402 may then resume 614 normal operation and/or fail 614. For example, the managed node 402 may continue to function without an application update. Additionally or alternatively, the managed node 402 may provide a failure message. For instance, the managed node 402 may display a failure message and/or send a failure notification to another device. In one configuration, the managed node 402 sends a failure message to an administrative system 434 using a network 432 (e.g., Local Area Network (LAN), the Internet, etc.).

If the managed node 402 determines 624 that setup was successful, then the managed node 402 may execute 628 the new application. In one configuration, the old application 404 launches the new application 404. For example, the old application 404 may include a function that calls the new application 404, which may cause the managed node 402 to execute the new application 404.

The managed node 402 may provide 630 one or more parameters to the new application 404 used by or provided to the old application 404. For example, the managed node 402 may provide 630 one or more parameters to the new application 404 that were provided to the old application 404 at the launch of the old application 404. Additionally or alternatively, the managed node 402 may provide 630 one or more parameters to the new application being used and/or generated by the old application 404.

The managed node 402 may send 632 the new application's return code to the original caller upon application termination. For example, when the new application is terminated, it provides a code. This code may be provided to the original caller upon termination of the new application 404. For example, when the new application 404 is terminated (e.g., when it 404 finishes its task(s) and/or is terminated by another application or a user), its return code may be passed to the original caller. For example, if the agent 421 called the application 404 (e.g., the old application), the return code may be sent 632 to the agent 421, which may report to the administrative system 434 that the (new) application 404 has been terminated. In another configuration, the return code may be sent 632 to the administrative system 434.

The managed node 402 may store 634 one or more deferred commands. For example, when the old application 404 is updated, one or more commands may be generated to delete the old application file(s) (e.g., old executable file(s) 422, old dynamically linked file(s) 424 and/or other old files). These old application files may not be used after the old application 404 is updated to the new application 404 (e.g., after the old application 404 is terminated). Commands to delete the old application files and/or other commands may be stored 634 to be performed at a later time. For example, the command(s) to delete the old application file(s)

may be deferred until the managed node 402 is rebooted. In one configuration, deferred commands may be added to the "PendingFileRename" operations registry key to delete the renamed files.

The managed node 402 may terminate 636 the old application 404. For example, the old application 404 may wait for the new application 404 to terminate. Once the new application 404 is terminated, the old application 404 may be terminated. For example, the old application 404 may download the new application 404, launch the new application 404 (passing it the same parameters that the old application 404 was passed), wait for the new application 404 to terminate and then terminate itself (the old application 404), returning the same return code that the new application 104 returned.

Figure 7:
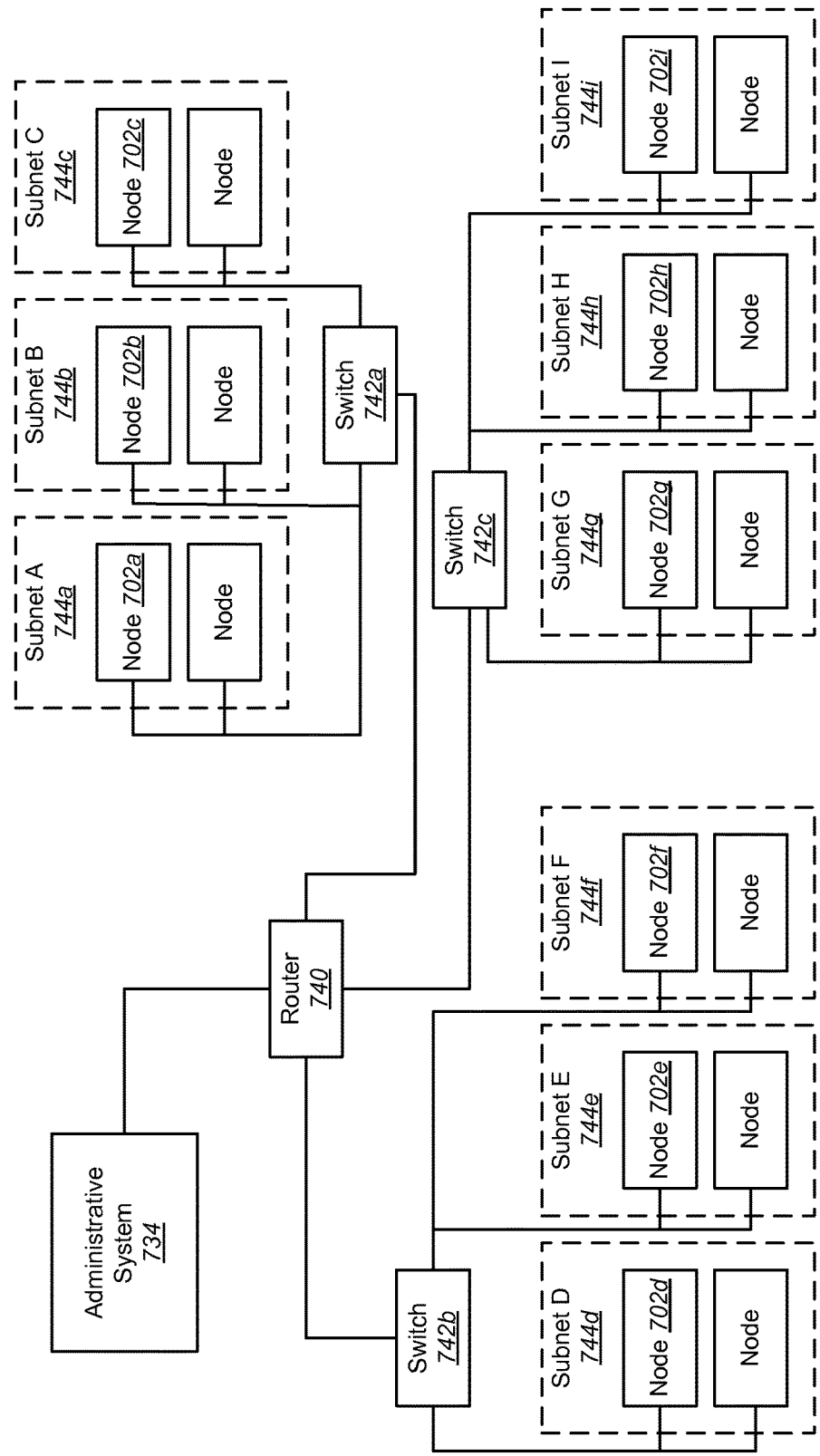
FIG. 7 is a block diagram that illustrates one configuration of a network where a system for updating a running application on a computing device (e.g., node) may be implemented.

FIG. 7 is a block diagram that illustrates one configuration of a network where a system for updating a running application on a computing device (e.g., node) may be implemented. An administrative system 734 is connected to a router 740. The router 740 is connected to switches 742*a*, 742*b*, 742*c*. The switch 742*a* is connected to several nodes 702*a*, 702*b*, 702*c*, etc., via their respective subnets 744*a*, 744*b*, 744*c*. The switch 742*b* is connected to several nodes 702*d*, 702*e*, 702*f*, etc., via their respective subnets 744*d*, 744*e*, 744*f*. The switch 742*c* is connected to several nodes 702*g*, 702*h*, 702*i*, etc., via their respective subnets 744*g*, 744*h*, 744*i*. Although FIG. 7 only shows one router 740, and a limited number of switches 742, subnets 744, and nodes 702, many and varied numbers of routers 740, switches 742, subnets 744 and nodes 702 may be included in networks and/or systems where a system for updating a running application may be implemented.

Figure 8:
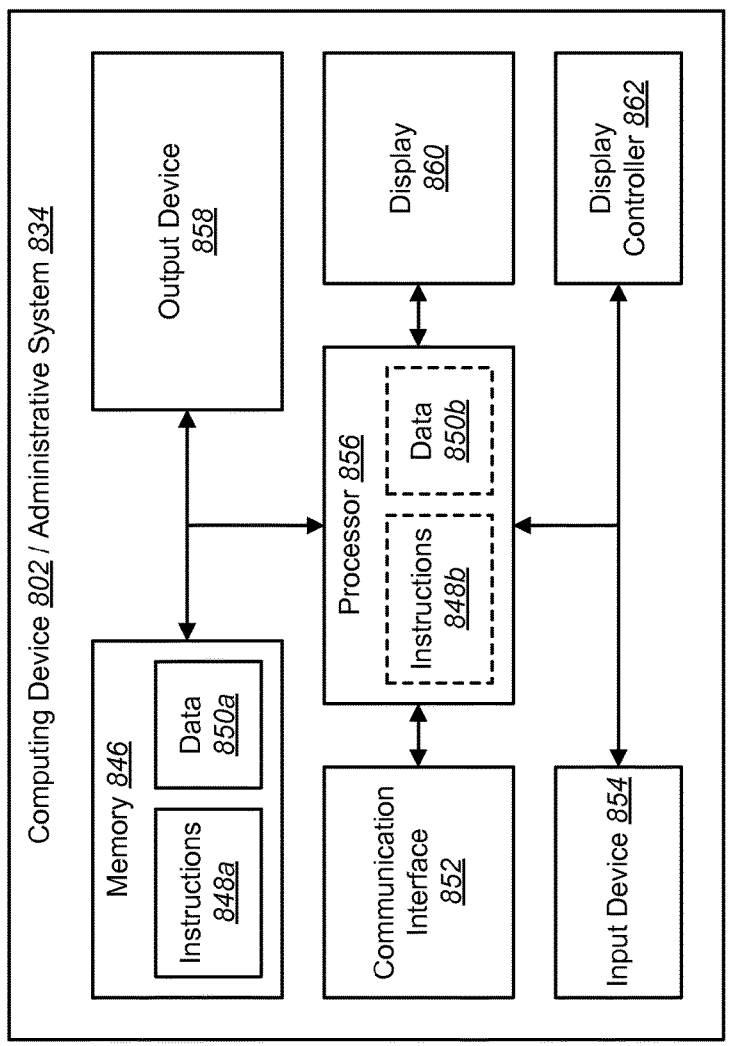
FIG. 8 illustrates various components that may be utilized in a computing device (e.g., managed node) and/or in an administrative system.

FIG. 8 illustrates various components that may be utilized in a computing device (e.g., managed node) 802 and/or in an administrative system 834. The illustrated components may be located within the same physical structure or in separate housings or structures.

The computing device 802 or administrative system 834 may include a processor 856 and memory 846. The memory 846 may include instructions 848*a* and data 850*a*. The processor 856 controls the operation of the computing device 802 or administrative system 834 and may be, for example, a microprocessor, a microcontroller, a digital signal processor (DSP) or other device known in the art. The processor 856 may be in electronic communication with the memory 846. The processor 856 typically performs logical and arithmetic operations based on program instructions 848*b* and/or data 850*b* it loads from the memory 846.

The computing device 802 or administrative system 834 typically may include one or more communication interfaces 852 for communicating with other electronic devices. The communication interfaces 852 may be based on wired communication technology, wireless communication technology, or both. Examples of different types of communication interfaces 852 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter and so forth.

The computing device 802 or administrative system 834 typically may include one or more input devices 854 and one or more output devices 858. Examples of different kinds of input devices 854 include a keyboard, mouse, microphone, remote control device, button, joystick, trackball, touchpad, lightpen, etc. Examples of different kinds of output devices 858 include a speaker, printer, etc. One specific type of output device which may be typically included in a computer system is a display device 860. Display devices 860 used with configurations disclosed herein may utilize any suitable image projection technology, such as a cathode ray tube (CRT), liquid crystal display (LCD), light-emitting diode (LED), gas plasma, electroluminescence, or the like. A display controller 862 may also be provided for converting data 850*a* stored in the memory 846 into text, graphics and/or moving images (as appropriate) shown on the display device 860.

Of course, FIG. 8 illustrates only one possible configuration of a computing device 802 or administrative system 834. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable or processor-readable statement(s). For example, the terms "instructions" and "code" may refer to one or more programs, routines, sub-routines, functions, procedures, etc. "Instructions" and "code" may comprise a single computer-readable statement or many computer-readable or processor-readable statements.

The term "computer-readable medium" refers to any available medium that can be accessed by a computer or processor. By way of example and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers. It should be noted that a computer-readable medium may be tangible and non-transitory.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device configured for updating a running application, comprising:
    a processor;
    a memory in electronic communication with the processor;
    instructions stored in the memory, the instructions being executable to:
        execute an old application;
        determine whether a new application file associated with a new application exists by querying a remote server;
        retrieve the new application file using a computer network;
        store the new application file in a different folder than an old application file associated with the old application;
        rename the old application file that is currently in use;
        move the new application file, after the old application file is renamed, to a same folder as the old application file;
        store a parameter provided to or used by the old application;
        determine whether the new application is set up successfully, wherein a set up comprises configuring an application setting associated with the new application, wherein the new application is a newer version of the old application;
        execute the new application if the new application is set up successfully;
        provide the parameter to the new application;
        send a new application return code to an original caller through the computer network, via the old application, in response to ceasing the execution of the new application and subsequent to the execution of the new application; and
        store a deferred command to delete the old application file from the computing device in response to rebooting the computing device.

2. The computing device of claim 1, wherein the instructions are further executable to rename the old application file back to an original name if the new application is not set up successfully.

3. The computing device of claim 1, wherein the instructions are further executable to terminate the old application.

4. The computing device of claim 1, wherein the instructions are further executable to receive an update command.

5. The computing device of claim 4, wherein the update command is received using the computer network.

6. The computing device of claim 1, wherein the new application file comprises a binary (BIN) file.

7. The computing device of claim 1, wherein the new application file comprises a dynamic link library (DLL) file.

8. The computing device of claim 1, wherein the new application includes a vulnerability definition that is not included in the old application.

9. The computing device of claim 1, wherein the renaming the old application file that is currently in use is performed using one of a "MoveFile" or "MoveFileEx" function.

10. The computing device of claim 1, wherein executing the new application includes the old application launching the new application.

11. A method for updating a running application on a computing device, comprising:
    executing, on a computing device, an old application;
    determining whether a new application file associated with a new application exists by querying a remote server;
    retrieving the new application file using a computer network;
    storing the new application file in a different folder than an old application file associated with the old application;
    renaming, on the computing device, the old application file that is currently in use;
    moving the new application file, after the old application file is renamed, to a same folder as the old application file;
    storing a parameter provided to or used by the old application;
    determining whether the new application is set up successfully, wherein a set up comprises configuring an application setting associated with the new application, wherein the new application is a newer version of the old application;
    executing, on the computing device, the new application if the new application is set up successfully;
    providing the parameter to the new application;
    sending a new application return code to an original caller through the computer network, via the old application, in response to ceasing the execution of the new application and subsequent to the execution of the new application; and storing a deferred command to delete the old application file from the computing device in response to rebooting the computing device.

12. The method of claim 11, further comprising renaming the old application file back to an original name if the new application is not set up successfully.

13. The method of claim 11, further comprising terminating the old application.

14. The method of claim 11, further comprising receiving an update command.

15. The method of claim 14, wherein the update command is received using the computer network.

16. A non-transitory, tangible computer-readable medium for updating a running application, comprising executable instructions for:

executing an old application;
  determining whether a new application file associated with a new application exists by querying a remote server;
  retrieving the new application file using a computer network;
  storing the new application file in a different folder than an old application file associated with the old application;
  renaming the old application file that is currently in use;
  moving the new application file, after the old application file is renamed, to a same folder as the old application file;
  storing a parameter provided to or used by the old application;
  determining whether the new application is set up successfully, wherein a set up comprises configuring an application setting associated with the new application, wherein the new application is a newer version of the old application;
  executing the new application if the new application is set up successfully;
  providing the parameter to the new application;
  sending a new application return code to an original caller through the computer network, via the old application, in response to ceasing the execution of the new application and subsequent to the execution of the new application; and
  storing a deferred command to delete the old application file from the computing device in response to rebooting the computing device.

* * * * *